United States Patent [19]

Ehm et al.

[11] Patent Number: 4,566,679
[45] Date of Patent: Jan. 28, 1986

[54] METHOD OF CLAMPING TUBE-LIKE MEMBERS AND APPARATUS FOR CARRYING OUT THE METHOD

[75] Inventors: Karl H. Ehm, Duisburg; Roderich R. Orendi, Düsseldorf, both of Fed. Rep. of Germany

[73] Assignee: Tremag Trennmaschinen-Gesellschaft mbH, Duisburg, Fed. Rep. of Germany

[21] Appl. No.: 594,575

[22] Filed: Mar. 29, 1984

[30] Foreign Application Priority Data

Mar. 31, 1983 [DE] Fed. Rep. of Germany ....... 3312384

[51] Int. Cl.$^4$ .............................................. B23D 47/04
[52] U.S. Cl. .................................... 269/23; 83/71; 83/72; 83/176; 83/360; 83/380; 83/54; 72/26; 72/304
[58] Field of Search ...................... 83/17, 19, 54, 176, 83/360, 361, 362, 380, 71, 72, 457, 466, 451, 452; 72/21, 22, 23, 26, 304; 269/23, 26, 111, 155

[56] References Cited

U.S. PATENT DOCUMENTS

| | | | |
|---|---|---|---|
| 2,769,224 | 11/1956 | Hake | 269/23 |
| 2,781,573 | 2/1957 | Espari et al. | 83/380 X |
| 2,925,005 | 2/1960 | Hensley | 83/176 |
| 3,570,349 | 3/1971 | Behrendt | 83/453 |
| 3,660,883 | 5/1972 | Hoeckele | 72/26 |
| 3,709,075 | 3/1973 | Goellner | 83/466 X |

*Primary Examiner*—James M. Meister
*Attorney, Agent, or Firm*—King, Liles & Schickli

[57] ABSTRACT

An apparatus and method of clamping tube-like members on a clamping support, for cutting off portions of the tube-like members are provided. Clamping forces are applied to the tubes alternately in horizontal and vertical directions in such a way that the clamping forces generated are higher than clamping forces which are applied only in a horizontal direction, without however causing permanent deformation of the tube-like members. The apparatus comprises a horizontal clamping mechanism and a vertically displaceable clamping member. A measuring device is associated with the horizontal clamping mechanism and the vertically displaceable clamping member, for measuring the geometrical deformation of the tube-like members which occurs during a clamping operation. The measuring device produces a signal to stop the clamping operation before the degree of deformation of the tube-like members reaches an inadmissible value.

10 Claims, 9 Drawing Figures

METHOD OF CLAMPING TUBE-LIKE MEMBERS AND APPARATUS FOR CARRYING OUT THE METHOD

BACKGROUND OF THE INVENTION

In one form of method for clamping tubes or the like which are disposed on a clamping support means either individually or in layers, for example for the purposes of the tubes being cut into sections by means of a suitable cutting device, clamping forces are applied to the tubes on mutually oppositely disposed sides thereof in a direction corresponding to the tube support or mounting plane, the clamping forces being at maximum of such a magnitude that, when only those forces are acting on the tubes or like members, those members do not experience any inadmissible permanent deformation. The tubes or like members are held in position in such a way that one cannot slide up over the other, by means of hold-down forces acting on the tubes or like members transversely with respect to the direction of the above-mentioned support or mounting plane.

In this specification and the claims appended hereto the expression tube or like member, or alternatively, tube-like member, or the plurals thereof, will be used for the sake of brevity and convenience to denote any member to which the present invention is to be applied.

A clamping apparatus which operates on the basis of such a method has clamping jaws which are displaceable relative to each other in the direction of the tube support plane, and also a clamping jaw which is movable transversely with respect to the direction of that plane, being therefore movable in an at least substantially vertical direction towards and away from that plane, in order to hold the tube members down on the support plane. The clamping forces are primarily applied by means of clamping jaws, as referred to above, which thus act in the direction of the support plane. The vertically movable clamping jaw only performs an auxiliary function and, as indicated, essentially acts as a means for holding down the tubes, in order to prevent them from sliding up over each other when subjected to relatively high forces in a direction parallel to the surface on which they are supported, so that the tubes or other members to be cut can be reliably clamped in position.

With the known method however it is not possible, in many circumstances, reliably to prevent the tubes or like members from turning or twisting during the cutting operation, which is performed for example by means of a saw apparatus, particularly when high cutting forces are applied. Twisting or turning of the members during the cutting operation can result in damage to and even destruction of the cutting tools, while also having adverse effects on the quality of the cut at the cut surfaces. It is not possible to remedy such problems by merely increasing the clamping forces as after the clamping operation, the tubes or like members should not suffer from permanent deformation in the region in which they were clamped. That means that the cutting devices usually operate at a considerably lower cutting rate than is technologically and theoretically possible as the turning or twisting moments which are applied to the tubes or like members by virtue of the cutting forces must always be lower than the torque values which are permitted by the clamping forces applied to hold the tubes or like members in position.

In another form of clamping apparatus, the vertically movable clamping jaws have, for each tube-like member to be clamped, a depression or recess of prismatic configuration, which is adapted suitably to the tube-like member. Although higher clamping forces can be applied in a vertical direction by means of such an apparatus, there is the disadvantage that particular clamping jaws are required for different diameters of tube-like members to be clamped, while in addition considerable problems occur when a layer or array of tube-like members is being moved into the clamping region in the machine.

Clamping systems have also been put forward, in which small cylinder means are disposed in the vertically movable clamping jaw, the action of such cylinder means being such that each tube-like member can be individually clamped in position. That arrangement suffers from the disadvantage that it is difficult to arrange the cylinder means in the clamping jaw if tube-like members of different diameters are to be clamped thereby.

SUMMARY OF THE INVENTION

An object of the present invention is to provide a method of clamping one or more tube-like members, which does not suffer from the above-mentioned disadvantages of previous methods.

Another object of the present invention is to provide a method of clamping one or more tube-like members which are disposed individually or in a layer or array on a clamping support, such as to permit the member or members to be clamped without permanent deformation, while applying high clamping forces.

A further object of the present invention is to provide a method of clamping tubes or like members for the purposes of subsequently cutting same into portions, such that the members are generally resistant to rotary movement thereof during the cutting operation, even when cutting forces of substantial magnitude are applied.

Yet another object of the present invention is to provide a method of clamping tube-like members without causing unacceptable permanent deformation thereof, which can be readily employed for tube-like members of a wide range of diameters.

Still another object of the present invention is to provide an apparatus for clamping tubes or like members which are to be cut, which permits substantial forces to be applied to the tubes to hold them in place, without causing inadmissible permanent deformation thereof.

Still a further object of the present invention is to provide a clamping apparatus for clamping tube-like members, with measuring means for preventing serious deformation of the members to be cut while ensuring that they are reliably and firmly held in position.

A yet further object of the invention is to provide an apparatus for clamping one or more tube-like members, which can be readily used for clamping a wide range of different sizes of such members, without substantial alteration of the apparatus.

In accordance with the present invention, these and other objects are achieved by a method of clamping tube-like members (as hereinbefore defined), which are disposed on a clamping support means or support surface, individually or in layers or aligned arrays, for the purposes of cutting off portions thereof by means of a cutting device, wherein clamping forces are applied in the direction of the support or mounting plane, on oppositely disposed sides, the clamping forces being at a maximum of such a magnitude (referred to hereinafter as $P_{h1}$zul.) that the tube-like members do not experience inadmissible permanent deformation when only those forces act thereon, and the tube-like members are secured against being pushed one over the other by forces which act on the tube-like members to hold them down, such hold-down forces acting on the tube-like members transversely with respect to the direction of the support plane, on mutually oppositely disposed sides. While applying or before applying the clamping forces which act in the direction of the mounting plane, being of the above-stated maximum magnitude $P_{h1}$zul., forces which act transversely with respect to the direction of the mounting plane are applied, such forces being of only such a magnitude that the tube-like members are secured against being pushed one over the other as aforesaid without increasing or substantially increasing the forces with which the tube-like members bear against the clamping support surface. Subsequently, the tube-like members are subjected to the action of clamping forces which act transversely with respect to the direction of the mounting plane, such clamping forces being of the above-specified magnitude $P_{h1}$zul. per tube-like member, or, where there is a layer or array of tube-like members, the magnitude of the clamping forces is $n \cdot P_{h1}$zul., wherein $n$ is the number of tube-like members in the layer or array. In the next step of the method, the clamping forces acting in the direction of the mounting or support plane and the clamping forces acting transversely with respect thereto, per tube-like member, are increased to a value of at most $P_{h2}$zul. or $n \cdot P_{h2}$zul. in the case where there is a plurality of tube-like members in a layer or array, wherein $P_{h2}$zul. is the force at which the tube-like members do not experience inadmissible permanent deformation when subjected to forces acting thereon simultaneously in the mounting or support plane and transversely with respect to the mounting or support plane, at mutually oppositely disposed locations relative to the respective tube-like member or members.

It will be seen therefore that the principle of the present invention makes use of the fact that the clamping forces which only produce deformation of the tube-like member or members in the elastic range and which are thus acceptable for a clamping operation are considerably higher when those forces, with respect to the periphery of the or each tube-like member, act on four mutually oppositely disposed locations, that is to say, in the direction of the plane in which the tube-like members are supported or mounted, and transversely with respect to that direction. That force, referred to hereinbefore and also hereinafter as $P_{h2}$zul., is greater than the force of magnitude $P_{h1}$zul. which is the force at which the tube-like members do not experience inadmissible permanent deformation, when subjected only to that force. In addition, the above-mentioned increased forces act on the tube-like member or members at four peripheral portions thereof, which results in a substantially higher total clamping force than in a previous clamping method as referred to above, wherein the principal clamping forces of a magnitude $P_{h1}$zul. act only on two oppositely disposed peripheral regions, while the hold-down forces which act transversely to the above-mentioned main clamping forces are of only subordinate significance.

It should also be appreciated that the hold-down forces which in the previously disclosed clamping method are applied to the tube-like members in at least substantially vertical direction, when used in relation to a layer or linear array of tube-like members, prevent the clamping forces which are applied to the outermost tube-like members at each end of the layer or array in the direction in which the layer extends, from also being uniformly distributed to the tube-like members which are further inwardly of the layer or array. On the contrary, the clamping forces which act in the direction parallel to the support surface or mounting plane on which the tube-like members are supported are partially absorbed by the frictional forces, which occur as a result of deformation of the outwardly disposed tube-like members, between the clamping support surface and the vertically movable clamping jaw, with the result that the forces between the tube-like members which in theory are in line contact with each other, decrease with increasing distance from the respective outermost tube-like members in the layer or array. With that form of the previous method therefore, that has the result that only the outermost tube-like members are subjected to the above-indicated force $P_{h1}$zul., whereas the more inwardly disposed tube-like members are subjected to clamping forces of somewhat smaller magnitude.

It will be seen therefore that the above-indicated disadvantage is at least substantially remedied by the teaching of the present invention which provides that the tube-like members are initially subjected to forces which act transversely with respect to the direction of the support or mounting plane, being only of such a magnitude as to ensure that the tube-like members cannot be displaced one over the other, without however substantially increasing the forces with which the tube-like members bear against the support surface. By virtue of that step, when the clamping force $P_{h1}$zul. is applied in the direction of the mounting or support plane, thereby pressing all the tube-like members against each other in the layer or array, that force acts substantially uniformly on all the tube-like members. Subsequently, as indicated above, a force of a magnitude $P_{h1}$zul. is also applied to each tube-like member, transversely with respect to the mounting or support plane thereof, on oppositely disposed sides thereof. It will be appreciated that, as the tube-like members are disposed parallel to each other in the direction which is transverse with respect to the mounting or support plane, and not disposed in succession one behind the other as in the direction corresponding to the direction of the mounting or support plane, applying the above-mentioned force transversely to the direction of the mounting plane can be done by applying a common clamping jaw or like member to the aligned tube-like members.

The clamping forces which are not acting on each tube-like member at four locations on the periphery thereof, are then further increased, more specifically to a maximum value of $P_{h2}$zul. per tube-like member. As the tube-like members are disposed in succession or one behind the other in the direction corresponding to the support or mounting surface thereof, the force applied to the tube-like members in that direction is to be increased to the above-specified value $P_{h2}$zul., while in a direction transverse to the above-indicated direction, the force is to be increased to $n \cdot P_{h2}$zul., because the tube-like members are disposed 'in parallel' in that direction.

For the sake of enhanced clarity of description at this point, reference will be made to a numerical example as an illustration of the above-indicated mode of operation in accordance with the teachings of the present invention. When the above-indicated parameter n is of a value 46, so that there are therefore 46 tube-like members per layer or array, a value $P_{h1}zul.$ of 484 kp was detected, with the materials and dimensions of the tube-like members which are found in practice. To compensate for the forces which are produced by the cutting forces of the cutting apparatus used however, clamping forces of a magnitude of 669 kp were required when the tube-like members were clamped in only one direction (clamping in a horizontal direction). As such a level of clamping forces cannot be in any way achieved with the prior-art clamping method, the cutting forces had to be reduced so that they fall below a value corresponding to the value $P_{h1}zul.$ in respect of clamping the tube-like members.

In comparison, with the method in accordance with the present invention, it is possible for the clamping forces to be increased to $P_{h2}zul.$ (in the direction of the mounting plane of the tube-like members) and n·$P_{h2}zul.$ (transversely with respect to the above-indicated direction). In the present situation under consideration, the values of those forces are 998 kp and 45900 kp respectively, while the clamping forces required, when achieving the maximum cutting rate, are 335 kp ($P_{h2}$) in the direction of the mounting plane and 15410 kp (n·$P_{h2}$) in a direction transverse to the direction of the mounting plane. It will be seen from these figures that the admissible clamping forces which can be produced by means of the method of the present invention are considerably higher than the clamping forces actually required. Therefore, in this situation, it is not even necessary for the clamping forces to be increased to the maximum values specified hereinbefore, that is to say, $P_{h2}zul.$ and n·$P_{h2}zul.$ respectively, but it is sufficient for the clamping forces acting in the respective directions, per tube-like member, to be increased to a value specified as $P_{h2}$ and n·$P_{h2}$, in order to permit the cutting operation to be carried out at the maximum cutting rate.

The clamping forces required are determined in a manner of which the man skilled in the art is aware, by determining the cutting machine torque of the cutting apparatus, having regard to the respective greatest cutting length occurring, the radius of the tube-like member, the outside diameter of the cutting apparatus and the tooth pitch (when the cutting member is a saw blade). Taking those factors, and taking into consideration the width of the cutting apparatus and the specific cutting forces, it is possible to calculate the tangential forces and to determine the cutting torque. Now, the clamping forces must be of such a magnitude that they in turn generate frictional forces and thus a frictional moment which permit a greater torque. The values $P_{h1}zul.$ and $P_{h2}zul.$ depend on the individual properties and qualities of the tube-like members, but can also be readily determined by the man skilled in the art.

The method in accordance with the present invention therefore makes it possible to clamp tube-like members or workpieces in such a way that, in spite of the cutting forces applied being the maximum forces that are technologically possible, the clamped tube-like members do not twist or turn during the cutting or sawing operation and do not suffer from permanent deformation after the cutting operation, irrespective of whether just a single tube-like member or an entire layer or array of such members is clamped, and irrespective of whether the sawing or severing cut is made at the beginning, at the end or at a position therebetween.

In another aspect of the present invention, an apparatus for carrying out the method in accordance with the principles of the present invention comprises a support means for supporting one or more tube-like members to be clamped, a clamping means which is arranged to apply clamping forces to the one or more tube-like members in a direction parallel to the support surface thereof, being for example in a horizontal direction, and a clamping beam or like member which is displaceable towards the clamping surface substantially normal thereto, for example vertically, the clamping beam member extending over the width of the layer or array of tube-like members. The horizontally movable clamping means and the vertically movable clamping member have measuring means for measuring the geometrical deformation phenomena which occur during the clamping operation, and the measuring means are operable to produce a signal for triggering the end of the clamping operation being carried out, when the value of admissible deformation is reached or begins to be exceeded. That arrangement can therefore provide that the apparatus automatically adjusts the clamping forces by virtue of measuring the respectively admissible elastic deformation during a clamping operation.

In accordance with a preferred feature of the present invention, the clamping means may have means for blocking or preventing a return motion thereof, thereby providing that, when the individual steps of the method are carried out, to achieve the desired clamping action, the clamping forces, once achieved, are retained and are thus not allowed to slip back to lower values.

Another preferred feature of the invention may provide that a clamping means has a plurality of clamping devices. Using a plurality of clamping devices in that way is an option that may be adopted if it should be found that the admissible clamping forces which can be produced in accordance with the method of the present invention are lower than the clamping forces required for the cutting operation. In that case, the clamping forces that can be produced may be increased by using a further clamping arrangement, for example by arranging clamping devices in oppositely disposed relationship on both sides of the cutting apparatus, which clamping devices are constructed in accordance with the teaching of the present invention and which carry out a clamping procedure in accordance with the principles of the method of this invention.

Another embodiment of the invention may provide that a contact means is associated with the vertically movable clamping beam member, the effect of which contact means is to shutt off the feed movement of the vertically movable clamping member when a given value is reached or begins to be exceeded.

Yet another embodiment of the invention may provide that, after a feed movement of the vertically movable clamping member has been shut off, the associated measuring means, when a low level of pressure of the clamping member against the tube-like member or members is reached, is set to zero again or the measurement value which is then to be found in the measuring means is stored in a computation or set-off or compensation constant.

In accordance with another feature of the invention, it may be provided that associated with the apparatus is a further measuring and computing system adapted to measure or detect predetermined data in respect of the tube-like members to be clamped. The apparatus may further include a travel measuring means for detecting the number of tube-like members involved.

The apparatus in accordance with the present invention therefore permits the clamping operation to be performed automatically in accordance with the input of product-specific data, and establishes whether the associated cutting apparatus can operate at the cutting rate and with the cutting force which is at the maximum possible level from the technical point of view.

It should also be pointed out at this stage that the forces due to gravity or the weight of components, which obviously occur, are not mentioned in describing the method in accordance with the invention. In many cases, the frictional forces which are caused by such forces and which act in opposition to the clamping forces in the direction of the mounting or support plane are negligible in relation to the clamping forces.

Further objects, features and advantages of the present invention will be more clearly apparent from the following description of a preferred embodiment.

DESCRIPTION OF THE PREFERRED EMBODIMENT

Figure 1:
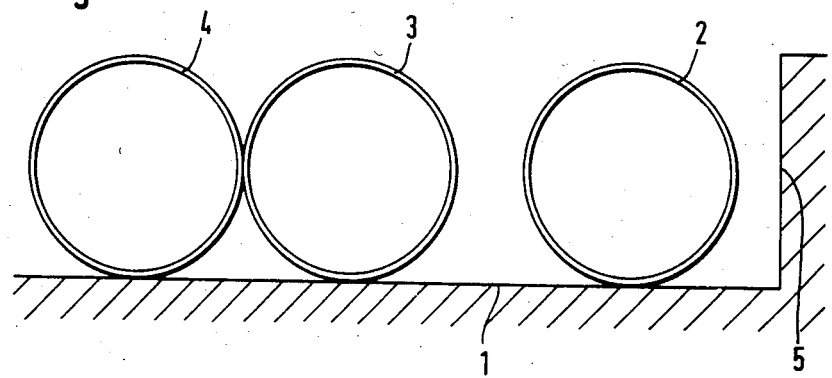
FIG. 1 is a diagrammatic sectional view of a clamping support arrangement with tube-like members lying thereon with their centres in a plane, before a clamping operation.
Figure 2:
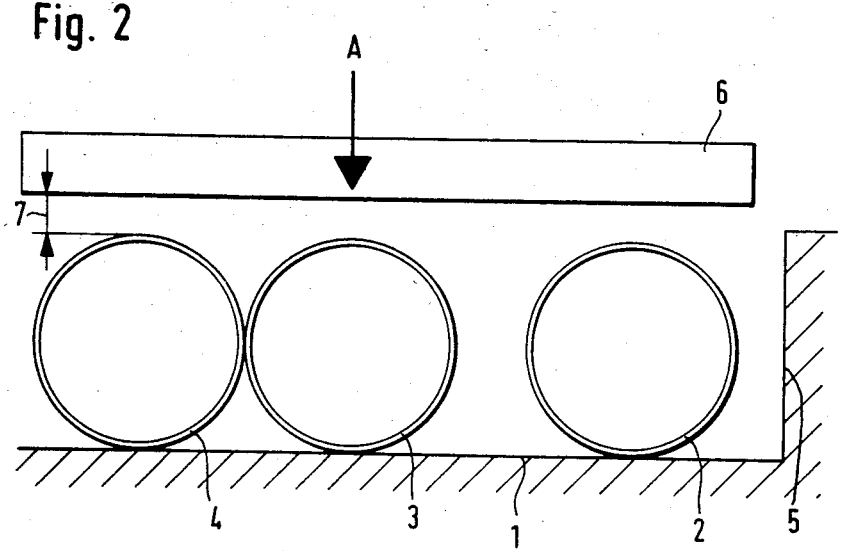
FIG. 2 is a view corresponding to the view shown in FIG. 1, with a clamping member for preventing the tube-like members from being pushed one over the other.

Referring firstly to FIG. 1, shown therein in diagrammatic form is a clamping support means 1 supporting tube-like members 2, 3 and 4 which are to be clamped in position in order to permit portions to be cut off the tube-like members 2, 3 and 4 by means of a suitable cutting apparatus such as a saw. The clamping support means 1 comprises a suitable support surface for supporting the tube-like members, which in practice will extend in a generally horizontal direction and which may be considered as defining a support or mounting plane for the tube-like members 2, 3 and 4. The illustrated apparatus also comprises a stationary clamping jaw 5 providing a clamping surface which in practice will extend substantially vertically and thus normal to the support surface on which the tube-like members rest.

An embodiment of a method in accordance with the present invention will now be described with reference to FIGS. 1 through 6 illustrating the various steps in the method:

In order to secure the tube-like members 2, 3 and 4 to prevent them from slipping one over the other, and thus to hold the tube-like members in a substantially aligned array wherein all the tube-like members are in contact with the horizontal support surface of the clamping support arrangement, clamping forces are applied to the tube-like members in the direction indicated by the arrow A, that is to say, transversely with respect to the direction of the mounting plane 1 and being therefore in a substantially vertically downward direction as illustrated in the drawings. Those forces which are thus intended to hold the tube-like members down on the support or mounting plane 1 are only of such a magnitude as to prevent the tube-like members from sliding or being displaced one over the other when they are subjected to forces which act in a substantially horizontal direction, that is to say, in a direction parallel to the support or mounting plane 1, but without increasing or at least noticeably increasing the forces with which the tube-like members 2 through 4 bear against the support surface 1. The application of the hold-down forces is diagrammatically indicated in FIG. 2, by means of a clamping beam or like member 6 applying the forces in the direction A. It will be appreciated that, as the tube-like members are disposed in side-by-side relationship and parallel to each other, it is possible to use a common downwardly movable clamping member 6 which thus embraces all the tube-like members in the aligned array thereof. It should be noted from FIG. 2 that the clamping member 6 is moved downwardly in the direction A only to such a degree that a spacing as indicated at 7 may remain between the underside of the clamping member 6 and the upward surfaces of the tube-like members 2 through 4.

Figure 3:
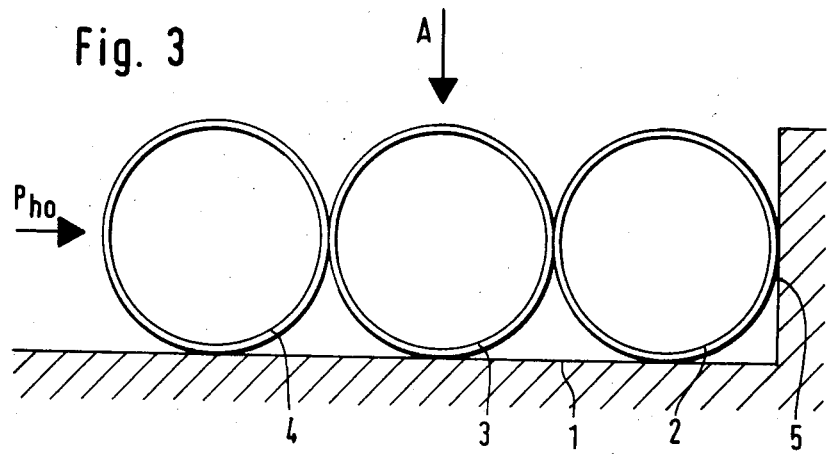
FIG. 3 shows the application of clamping forces in the direction of a plane through the centre of the tube-like members, whereby the tube-like members are pushed into contact against each other.
Figure 4:
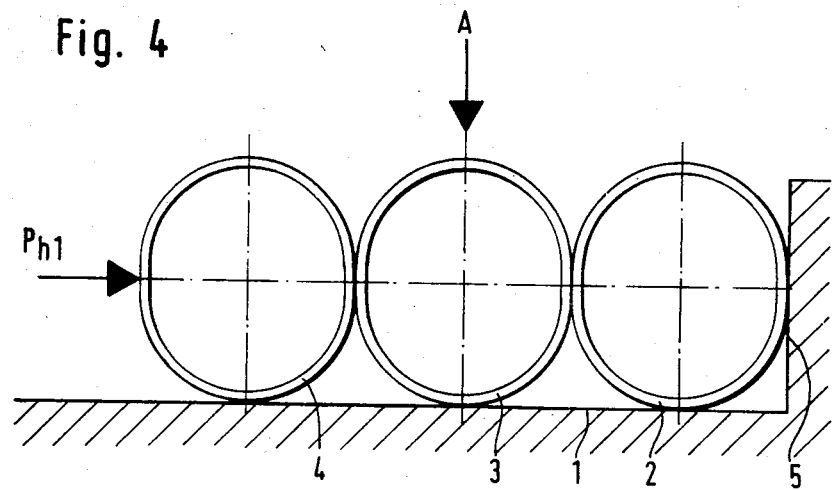
FIG. 4 shows a view corresponding to that shown in FIG. 3, with forces being applied such that the tube-like members do not experience inadmissible permanent deformation.

Subsequently, while still ensuring that the tube-like members cannot be pushed one over the other, by applying the force A, the clamping forces are applied in a direction parallel to the mounting plane 1, as shown in FIGS. 3 and 4. In that phase of the operation, the tube-like members are first pushed together, thereby overcoming the frictional forces which occur due to the weight of the tube-like members resting on the support surface 1, until the tube-like members are in line contact with each other. The force applied in a substantially horizontal direction is then increased to $P_{h1}$zul., which corresponds to the force at which the tube-like members do not experience any inadmissible permanent deformation, when subjected to the action of only those forces. Because the tube-like members are secured in position and cannot therefore slip one over the other, without increasing or substantially increasing the forces with which they bear against the support surface, the applied forces $P_{h1}$zul. act on all the clamped tube-like members, on mutually oppositely disposed sides thereof, and the result is deformation thereof in the elastic range, in such a way that the dimensions of the tube-like members in the plane of the linear array are reduced, while the dimensions in a direction normal to that plane are increased. That elastic deformation of each tube-like member can be seen in diagrammatic form from FIG. 4.

Figure 5:
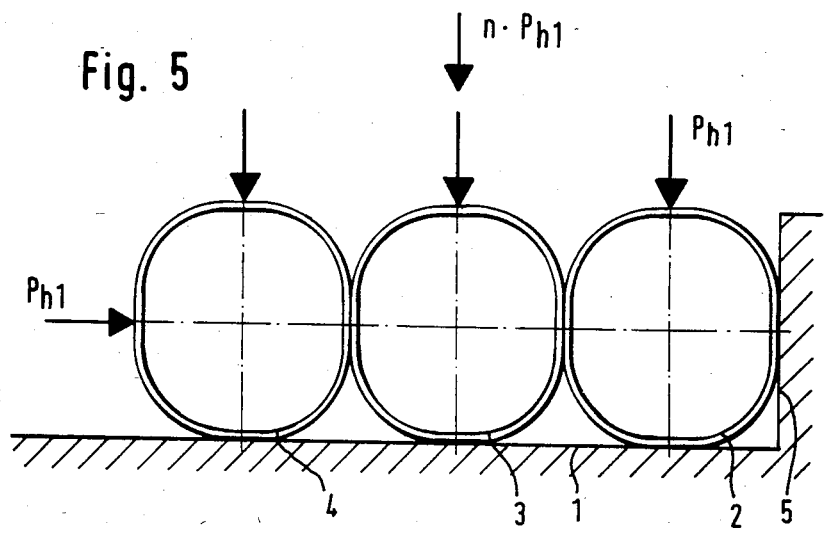
FIG. 5 shows a view corresponding to that shown in FIG. 4 but in which the forces acting on the tube-like members in a direction which is transverse with respect to the above-mentioned plane, per tube-like member, are increased to $P_{h1}$zul., with a total force applied of $n \cdot P_{h1}$zul. wherein n is the number of tube-like members.
Figure 6:
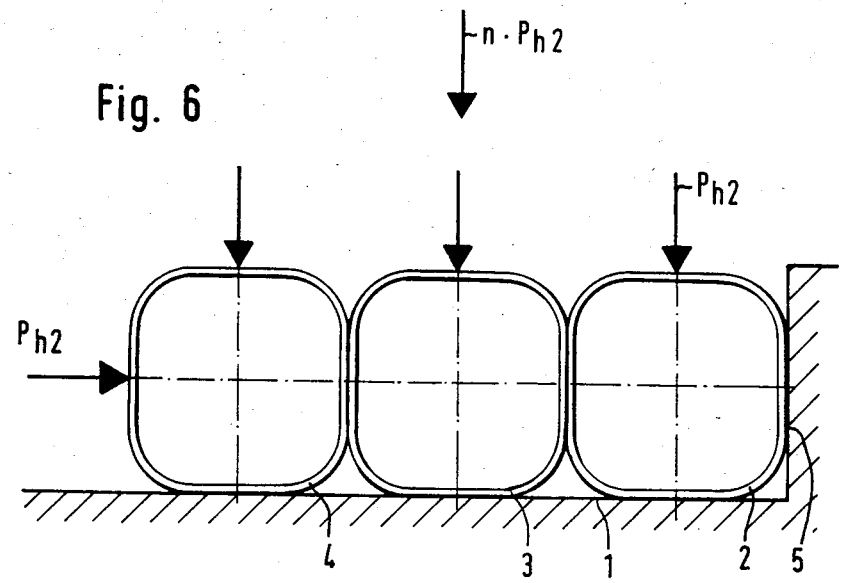
FIG. 6 is a view corresponding to that shown in FIG. 5, wherein the forces per tube-like member are increased to $P_{h2}$zul. both in the direction of the plane through the centres of the tube-like members and also transversely with respect thereto.

Then, forces of a magnitude denoted by $P_1$zul. are subsequently applied to each tube-like member in a direction which is transverse with respect to the direction of the support or mounting plane, that is to say, substantially vertically downwardly, in the manner shown in FIG. 5. In that way, each tube-like member is subjected to the force $P_{h1}$zul. If, for that purpose, use is made of an elongate clamping member of the kind shown for example in FIG. 2 and indicated by reference numeral 6, which therefore simultaneously engages all the tube-like members in the array, then the force applied by the clamping member in that way is denoted by n·$P_{h1}$zul., wherein n is the number of tube-like members in the array, being subjected to such forces.

When that condition is attained, the forces acting both in the direction of the plane of the array, that is to say, substantially horizontally, and transversely or normal with respect thereto, that is to say, substantially vertically downwardly, can be increased without permanent deformation of the tube-like members occurring. The increase may be up to a maximum of a value $P_{h2}$zul. in the direction of the plane of the array, that is to say, substantially horizontally, while transversely relative thereto, for each tube-like member, the force applied may also be increased to that value or, in total, when using a clamping member of elongate configuration adapted to engage all the tube-like members in the array, the force thus applied by the elongate clamping member is increased to n·$P_{h2}$zul. The force $P_{h2}$zul. is the force at which the tube-like members do not experience inadmissible permanent deformation when subjected to the action of forces engaging same simultaneously in the plane of the array and in a direction transversely or normal relative thereto, on opposite sides of the tube-like members. Of course, is should be recognized that the above-described sequencing of the hold-down and clamping forces may be controlled by a microprocessor or computer and standard software as is known in the art.

When the above-indicated clamping forces are reached, a comparison operation is then carried out, to ascertain whether those forces are higher than the cutting forces which can be achieved as optimum values from the technological point of view, of a cutting apparatus (not shown) which is operable to cut portions off the tube-like members 2, 3 and 4 in a direction parallel to the plane of the drawings in FIGS. 1 through 6. If the clamping forces are lower, then the cutting forces of the cutting apparatus are reduced for example by reducing the feed movement thereof so as to reduce the cutting forces to a lower level than the clamping forces.

Figure 7:
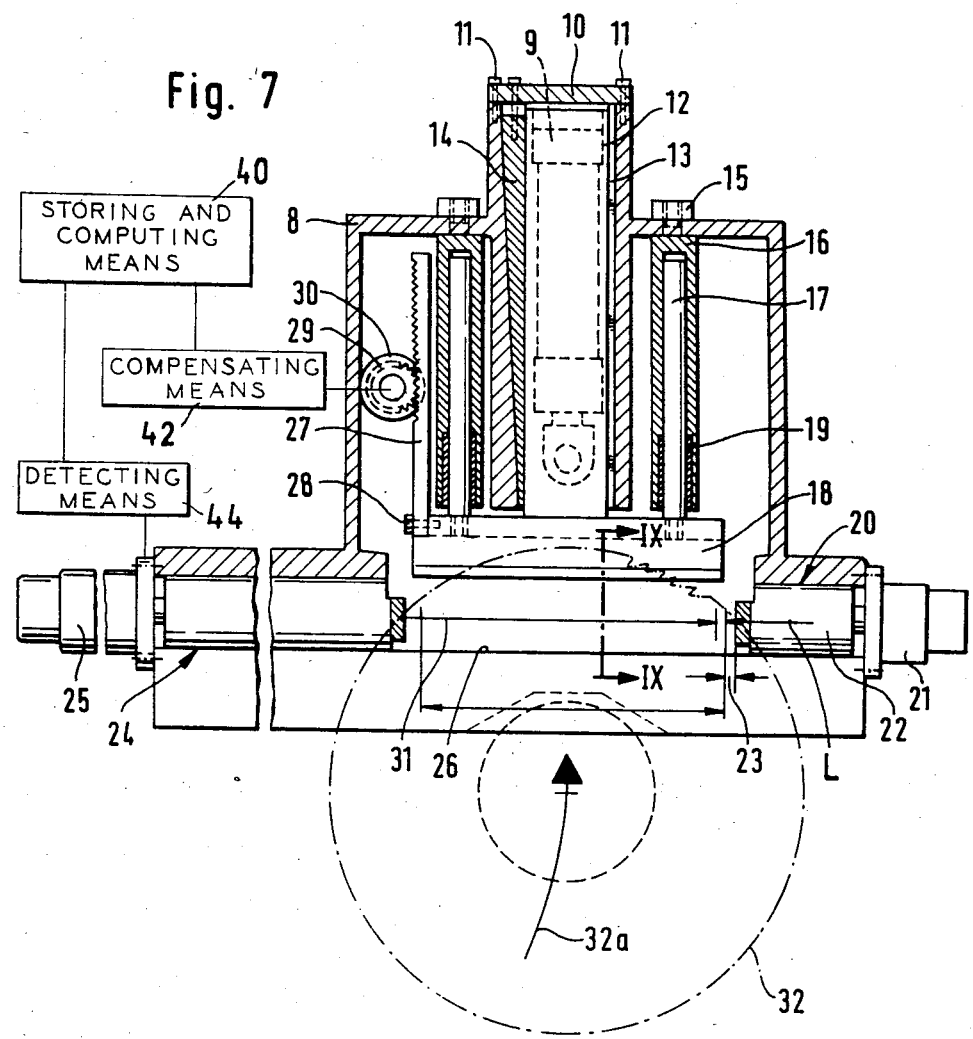
FIG. 7 is a diagrammatic view in longitudinal section through a clamping apparatus as an illustration of an embodiment of the apparatus according to the invention.

Reference will now be made to FIG. 7 which shows in rather more detail a still diagrammatic view of an apparatus for carrying out a method in accordance with the principles of this invention. As shown in FIG. 7, the apparatus comprises a housing 8 in which a vertical cylinder unit 9 is secured by means of a housing cover member 10 and screw means 11. A vertical slider 12 which is in the form of a hollow rod or bar member is guided vertically by means of flat guide devices 13 or comparable means. By virtue of a tapered bar member 14 or another corresponding arrangement, the play in the guidance of the slider 12 may be adjusted to the minimum value.

A clamp tube 16 is axially rigidly screwed to the housing 8 by means of a fixing plate 15. Disposed in the tube 16 is a clamp rod or bar 17 which in turn is rigidly connected to a vertically movable clamping jaw member 18. In the embodiment illustrated in FIG. 7, the clamping jaw member 18 is of an elongate configuration, therefore corresponding to the elongate member indicated at 6 in FIG. 2. The clamping jaw member 18 is in turn rigidly connected to the vertical slide member 12. Also disposed in the tube 16, in the lower portion thereof as illustrated in FIG. 7, is a clamp sleeve 19 which has the property that, when subjected to the action of pressure oil, it clamps the rod or bar 17 in per se known manner, thereby rigidly interconnecting the clamping jaw member 18 and the housing 8.

The apparatus further comprises a clamping arrangement 20 which is actuable by means of a cylinder unit 21. The clamping means 20 includes a clamping jaw member 22 which has an at least substantially vertical surface, in the position of the arrangement shown in FIG. 7. In the illustrated embodiment, the clamping jaw member 22 only performs release stroke movements as indicated by 23 in an at least substantially horizontal direction as indicated by reference numeral L. A horizontal clamping means 24 which is displaceable over the entire clamping stroke movement length is arranged to operate in the direction indicated by reference numeral 31, being actuated by means of a cylinder unit 25. The cylinder units 21 and 25 are of such a design, or are hydraulically actuated in such a way, that the force of the cylinder unit 21 is always greater than the force of the cylinder unit 25.

The apparatus has a clamping support means, as indicated by reference numeral 26 in FIG. 7, for supporting the tube-like members in an at least substantially horizontally disposed linear array. The support means 26 is rigidly connected both to a machine base structure (not shown herein) and also to the housing 8.

A gear rack member 27 if fixedly connected to the vertically movable clamping jaw member 18 by screw means diagrammatically indicated at 28. The rack member 27 is engaged by a rotary pinion 29 which in turn is connected to a rotary signal generator or sender 30. That arrangement forms a vertical measuring means for measuring the position of the vertically movable clamping jaw member 18. A similar arrangement (not shown) is provided for measuring the position of the horizontally moveable clamping means 24.

It will be appreciated that, for reasons of symmetry and even loading of the arrangement, the assembly comprising the components 15, 16, 17 and 19 is disposed on each of the two sides of the vertical slider 12, as can be seen from the drawing, although the components of that assembly are not specifically identified on the left-hand side of the drawing in FIG. 7.

The apparatus illustrated in FIG. 7 only represents a possible embodiment of such apparatus. It is readily possible for individual components to be replaced by other similar or correspondingly acting components. Thus, in place of the flat guide means 13, it would be possible to use roller-type guide means for example, or the assembly of components 15, 16, 17 and 19 could be replaced by other clamp elements. It is also possible to provide two cylinder units instead of a vertical cylinder 9 as illustrated, or for the assembly 15, 16, 17 and 19 to be disposed coaxially with the cylinder unit 9. In addition, from the point of view of the present invention, it is irrelevant whether the clamping means 20 and 24 which act in the directions 30 and 31 are set on one side or symmetrically in the operation of clamping the tube-like members which in use of the apparatus rest on the support means 26.

Figure 8:
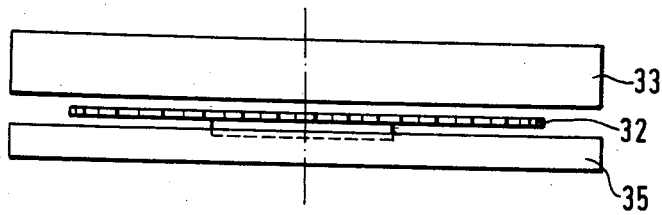
FIG. 8 is a simplified plan view of the apparatus shown in FIG. 7, with many components being omitted for the sake of enhanced clarity of the drawing.

Reference is now made to FIG. 8 showing a plan view of the FIG. 7 apparatus, in severely simplified form. Reference numeral 32 shows a cutting tool such as a saw blade which is also illustrated in FIG. 7 and which, in the cutting or sawing operation, is moved in an upward direction as indicated by the arrow 32a shown in FIG. 7. Reference numeral 33 in FIG. 8 denotes the contour of the clamping means described above with reference to FIG. 7. With the illustrated cutting mode, that is to say, in an upward direction as indicated by the arrow 32a, from below the workpieces or tube-like members to be cut, a further complete clamping arrangement may also be provided on the side of the saw blade 32 which is opposite to the clamping arrangement 33, the further clamping arrangement being shown in purely diagrammatic form by the contour line 35.

Figure 9:
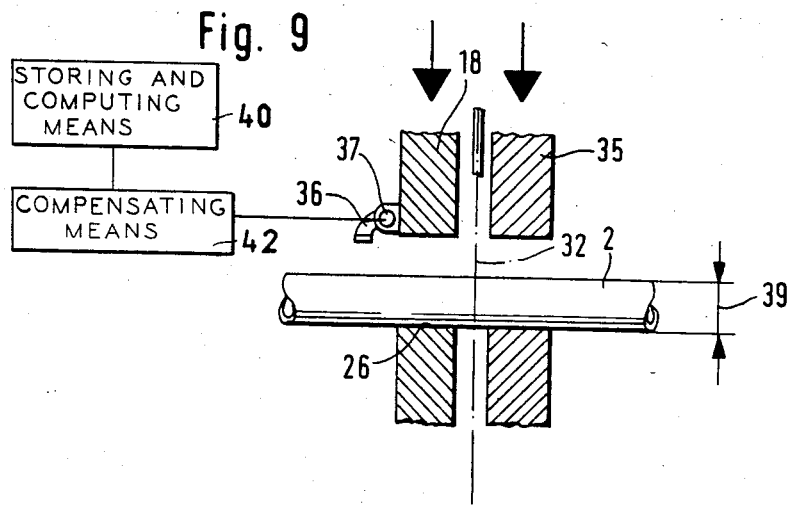
FIG. 9 is a diagrammatic view in section taken along line IX—IX in FIG. 7.

FIG. 9 is a diagrammatic sectional view through FIG. 8 with a tube-like member 2 which is supported on the support surface 26. Arranged on the vertically movable clamping jaw member 18 is a sensor 36 which, in the downward movement of the assembly, performs a rotary movement about its axis 37 and thus signals in per se known manner, for example by means of a limit switch (not shown) that the clamping jaw member 18 has reached the level of the diameter 39 of the tube-like member 2, that is to say, is at the level of the highest point on the periphery of the tube-like member 2 resting on the support surface 26. The sensing arrangement is operative over the entire width of the layer or array of tube-like members. Again, a similar contact sensing mechanism (not shown) is provided on the horizontal clamping means 24.

The mode of operation of the apparatus described above by way of example with reference to FIGS. 7 through 9 will be readily apparent from the general content of this specification, in regard to the method of clamping the tube-like members individually or in one or more layers or arrays, for the purposes of a subsequent operation such as a cutting operation. Specifically, storing and computing means 40, such as a software controlled microprocessor, receives a measurement output signal from the sender 30 representing the position of the vertical clamping member 18 upon contact with the tube-like member or members to be cut. A compensating means 42 connected to the storing and computing means 40 then assigns a zero value to this position along the measuring rack 27 corresponding to no deformation of the tube-like members(s). A similar procedure is followed as the horizontal clamping means 24 is brought into contact with the tube-like members thereby allowing means 44 to detect the number of tubular members to be clamped.

The characteristics of the tube-like members being cut and the cutting machine torque are known and programmed into the storing and computing means 40. The storing and computing means 40 sequences the clamping forces in accordance with the above description in light of these known characteristics to provide the necessary clamping pressure to the tube-like members. The displacement of the clamping means 18 and 24 from the zero value or contact position as measured through the rack 27 and pinion 29 and received from the sender 30 allows computation of the deformation of the members. Since the allowable deformation for the particular members is known, the apparatus allows the application of clamping pressure up to the permanent deformation limit. In the event the permanent deformation limit of the tubular members is reached prior to the application of the necessary clamping pressure for maintaining the tubular members in proper position for cutting, the cutting torque of the saw is adjusted lower by the storing and computing means 40 to assure that greater clamping forces than cutting forces are applied to the tube-like members. Thus, proper cutting action is assured.

Various modifications and alterations may be made in the abovedescribed embodiments of the method and apparatus in accordance with the principles of the present invention, without departing from the spirit and scope thereof.

We claim:

1. Apparatus for clamping at least one tube-like member in position for processing thereof, comprising: a clamping support means having a support surface on which said at least one member rests; clamping means which is displaceable in a direction parallel to said support surface, adapted to engage said at least one member which in operation of the apparatus is disposed on said support surface, to clamp same on respective oppositely disposed sides thereof; a clamping member which is displaceable towards said support surface and adapted to engage said at least one member carried thereon, to urge same towards said support surface for clamping of said at least one member against said support surface; measuring means operatively associated with said clamping means and said clamping member for measuring geometrical deformation of said at least one member which occurs during a clamping operation and adapted to produce a signal to trigger the end of a respective clamping operation when deformation of said at least one clamped member reaches a specified value without being permanent.

2. Apparatus as set forth in claim 1 wherein said clamping means have return motion blocking means to prevent inadvertent return motion thereof.

3. Apparatus as set forth in claim 1 wherein said clamping means comprises a plurality of clamping devices.

4. Apparatus as set forth in claim 1 wherein said clamping member is disposed in operative association with a contact means operable to shut off the feed movement of the clamping member when a given clamping force value is reached.

5. Apparatus as set forth in claim 4 wherein after said feed movement of the clamping member has been shut off, the associated measuring means, when a low level of pressure of the clamping member against said at least one member is reached, is set to zero.

6. Apparatus as set forth in claim 4 wherein after said feed movement of the clamping member has been shut off and when a low level of pressure of the clamping member is reached, the measuring value of said measuring means is stored therein as a compensation constant.

7. Apparatus as set forth in claim 1 including in operative association therewith a measuring and computing means adapted to detect predetermined data in respect of the tube-like member to be clamped.

8. Apparatus as set forth in claim 1 and including travel measuring means for detecting the number of tube-like members to be clamped.

9. A method of clamping tube-like members in a position for processing same, comprising:
   (a) positioning a plurality of said tube-like members in an aligned array on a support surface;
   (b) applying a first force to said members in a direction at least substantially normal to the direction in which said members are aligned, said first force being sufficient to hold said members in contact with the support surface but without substantially increasing their frictional engagement therewith;
   (c) applying a second force to said members at least substantially in the direction in which said members are aligned on said support surface, thereby to bring the members into mutual contact with each other on said support surface;
   (d) increasing said second force to the value of a third force which is such that any deformation of said members produced thereby, when said members were subjected only to said third force, is still within the elastic range of said members;
   (e) applying a fourth force to said members in a direction at least substantially normal to the direction in which said members are aligned, the value of said fourth force being such that, if said members were subjected only to said fourth force, any deformation of said members produced by said fourth force acting alone is still within the elastic range thereof; and
   (f) increasing said third and fourth forces at least substantially simultaneously to increase values higher than the firstmentioned values of said third and fourth forces but below the values at which permanent deformation of said members occurs when simultaneously subjected to said higher values of said third and fourth forces.

10. A method of clamping at least one tube-like member disposed on a support surface, to permit cutting off a portion of said at least one member by means of a circular saw, comprising the steps of:
   applying a hold-down force to said at least one member in a direction at least substantially normal to said support surface, the magnitude of said hold-down force being such that the force that said at least one member bears at rest against the support surface is not substantially increased;
   applying a first clamping force to said at least one member in a direction at least substantially parallel to said support surface on which said at least one member is supported; the magnitude of said first clamping force being at a maximum value without said at least one member experiencing inadmissible permanent deformation when only said first clamping force acts thereon;
   applying a second clamping force to said at least one member in said direction at least substantially normal to said support surface, the magnitude of said second clamping force being at a maximum value without said at least one member experiencing inadmissible permanent deformation when only said second clamping force acts thereon; and
   simultaneously increasing said first and second clamping forces to higher values without said at least one member experiencing inadmissible permanent deformation when simultaneously subjected to the action of said two clamping forces.

* * * * *